US012580763B2

(12) United States Patent
Marzorati et al.

(10) Patent No.: US 12,580,763 B2
(45) Date of Patent: Mar. 17, 2026

(54) USE OF TENSILE SPHERES FOR EXTENDED SYMMETRIC CRYPTOGRAPHY

(71) Applicant: International Business Machines Corporation, Armonk, NY (US)

(72) Inventors: Mauro Marzorati, Lutz, FL (US); Rosa M. Bolger, Austin, TX (US); Yaser K. Doleh, North Royalton, OH (US); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 18/196,921

(22) Filed: May 12, 2023

(65) Prior Publication Data

US 2024/0380588 A1      Nov. 14, 2024

(51) Int. Cl.
*H04L 9/30*      (2006.01)

(52) U.S. Cl.
CPC ................................. *H04L 9/3066* (2013.01)

(58) Field of Classification Search
CPC ...................................................... H04L 9/3066
See application file for complete search history.

(56) References Cited

U.S. PATENT DOCUMENTS

| | | | |
|---|---|---|---|
| 4,643,398 A | 2/1987 | Vetter | |
| 7,801,307 B2 | 9/2010 | Bantwal | |
| 11,128,454 B2 | 9/2021 | Kim | |
| 2006/0153364 A1* | 7/2006 | Beeson | .................. H04L 9/3252 |
| | | | 380/30 |
| 2013/0202104 A1* | 8/2013 | Ghouti | .................. H04L 9/3066 |
| | | | 380/28 |
| 2018/0049043 A1 | 2/2018 | Hoffberg | |
| 2019/0047687 A1 | 2/2019 | Larkin et al. | |
| 2023/0254145 A1* | 8/2023 | Hamburg | .............. H04L 9/3066 |
| | | | 380/28 |

FOREIGN PATENT DOCUMENTS

| | | |
|---|---|---|
| JP | 4643398 B2 | 3/2011 |
| KR | 20190047687 A | 5/2019 |
| WO | 2022055024 A1 | 3/2022 |

OTHER PUBLICATIONS

Signh et al., "Public key cryptography using sphere and spheroid," International Journal of Communication Networks and Distributed Systems, vol. 21, No. 3, 2018, pp. 363-383.

(Continued)

*Primary Examiner* — Rupal Dharia
*Assistant Examiner* — Devin E Almeida
(74) *Attorney, Agent, or Firm* — Zilka-Kotab, P.C.

(57)      ABSTRACT

A computer-implemented method includes generating two tensile circles based on a common circle created by overlapping two tensile spheres. An angle is determined using a modulo function and a predefined value. The angle is applied to both tensile circles. Next, multiplicands are determined for both tensile circles based on the angle applied to both tensile circles. The method then encrypts and/or decrypts data using a symmetric cryptography technique and the multiplicands.

20 Claims, 6 Drawing Sheets

300

302 — Generate two tensile circles based on a common circle created by overlapping two tensile spheres 304 — Determine an angle using a modulo function and a predefined value, wherein the angle is applied to both tensile circles 306 — Determine multiplicands for both tensile circles based on the angle applied to both tensile circles 308 — Encrypt and/or decrypt data using a symmetric cryptography technique with the multiplicands

(56)            References Cited

OTHER PUBLICATIONS

Chatterjee et al., "A new Symmetric key Cryptography Algorithm using extended MSA method: DJSA symmetric key algorithm." 2011 International Conference on Communication Systems and Network Technologies, 2011, pp. 89-94.

Xuelong et al., "A Symmetric Cryptography Based on Extended Cellular Automata," IEEE International Conference on Systems, Man and Cybernetics, Oct. 2005, 5 pages.

Dunkelman et al., "Adapting Rigidity to Symmetric Cryptography: Towards "Unswerving" Designs," SSR '19, Nov. 11, 2019, pp. 69-80.

Gaspar et al., "Secure Extension of FPGA General Purpose Processors for Symmetric Key Cryptography with Partial Reconfiguration Capabilities," ACM Transactions on Reconfigurable Technology and Systems, vol. 5, No. 3, Oct. 2012, 13 pages.

Phull et al., "Symmetric Cryptography using Multiple Access Circular Queues (MACQ)," ICTCS '16, Mar. 2016, 6 pages.

Syamsuddin et al., "Usability Assessment on Symmetric Cryptography Learning Module," 2nd International Conference on Computer and Information Sciences (ICCIS), Nov. 2020, 6 pages.

Wikipedia, "Elliptic-curve cryptography," Wikipedia, 2023, 13 pages, retrieved from https://en.wikipedia.org/wiki/Elliptic-curve_cryptography.

Wikipedia, "Modular exponentiation," Wikipedia, 2023, 9 pages, retrieved from https://en.wikipedia.org/wiki/Modular_exponentiation.

Wikipedia, "Modulo," Wikipedia, 2023, 20 pages, retrieved from https://en.wikipedia.org/wiki/Modulo.

Wikipedia, "Circle of a sphere," Wikipedia, 2022, 3 pages, retrieved from https://en.wikipedia.org/wiki/Circle_of_a_sphere##Sphere-sphere_intersection.

Wikipedia, "Solar eclipse," Wikipedia, 2023, 43 pages, retrieved from https://en.wikipedia.org/wiki/Solar_eclipse.

Wikipedia, "Tensor field," Wikipedia, 2023, 8 pages, retrieved from https://en.wikipedia.org/wiki/Tensor_field.

Chen et al., "New visual cryptography system based on circular shadow image and fixed angle segmentation," Journal of Electronic Imaging, vol. 14, 2005, 5 pages.

Singh et al., "Public key cryptography using sphere and spheroid," International Journal of Communication Networks and Distributed Systems, vol. 21, No. 3, Sep. 5, 2018, pp. 363-383, Abstract Only.

\* cited by examiner

100

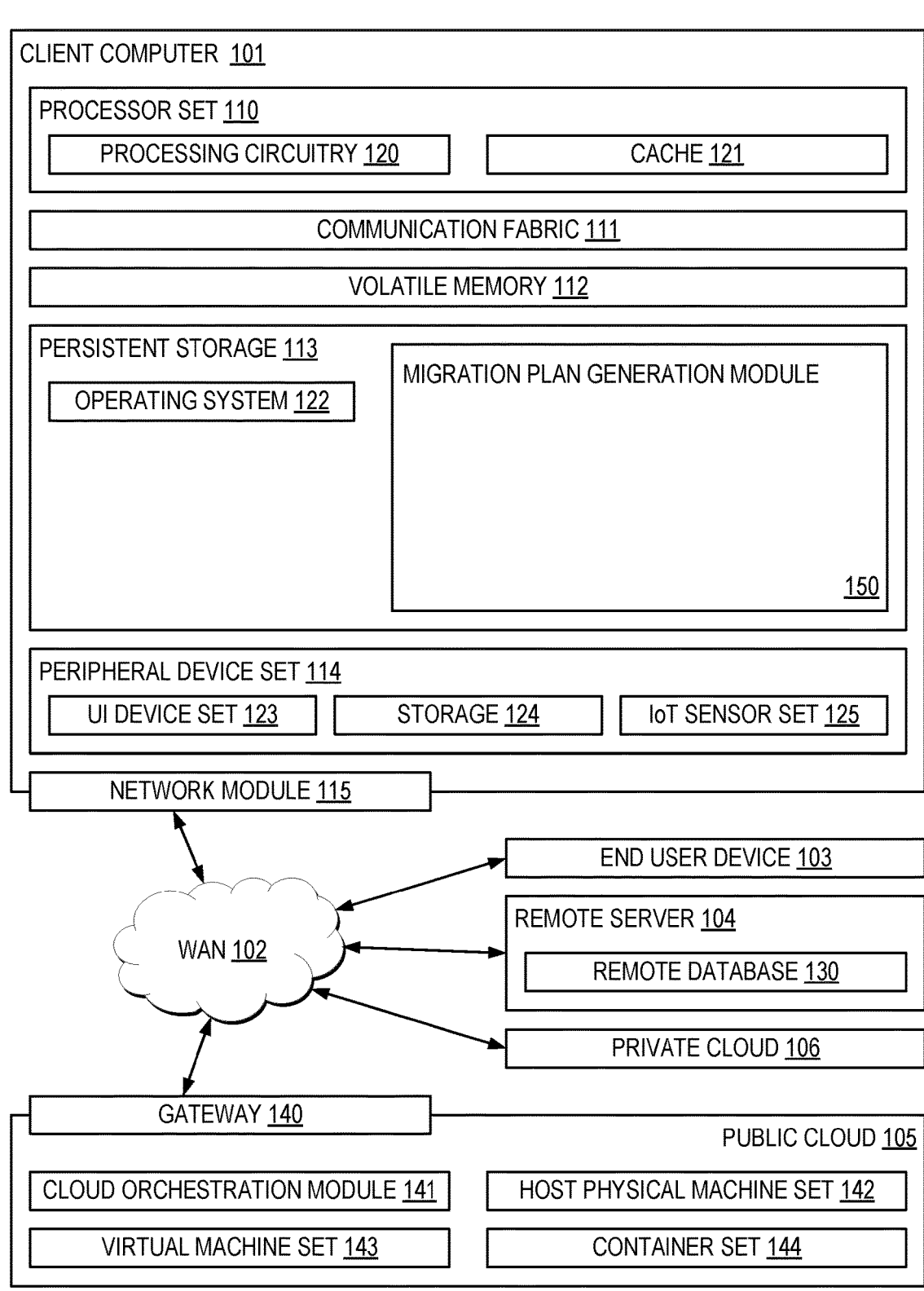

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

MIGRATION PLAN GENERATION MODULE

150

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141      HOST PHYSICAL MACHINE SET 142

VIRTUAL MACHINE SET 143      CONTAINER SET 144

FIG. 1

USE OF TENSILE SPHERES FOR EXTENDED SYMMETRIC CRYPTOGRAPHY

BACKGROUND

The present invention relates to the use of tensile spheres in symmetric cryptography as a hedge for maintaining leadership against the expected advances of quantum computing, until proper quantum-computing resistant cryptography mechanisms may be developed.

Public-key (PKI) cryptography is an asymmetric cryptography system based on the intractability of certain mathematical problems. Early public-key systems based their security on the assumption that it is difficult to factor a large integer composed of two or more large prime factors. For later elliptic-curve-based protocols, the base assumption is that finding the discrete logarithm of a random elliptic curve element with respect to a publicly known point is infeasible: this is the "elliptic curve discrete logarithm problem" (ECDLP). The security of elliptic curve cryptography depends on the ability to compute a point multiplication and the inability to compute the multiplicand given the original and product points.

The primary benefit promised by elliptic curve cryptography is a smaller key size, reducing storage and transmission requirements, i.e., that an elliptic curve group could provide the same level of security afforded by an RSA-based system with a large modulus and correspondingly larger key: for example, a 256-bit elliptic curve public key should provide comparable security to a 3072-bit RSA public key.

The size of the elliptic curve, measured by the total number of discrete integer pairs satisfying the curve equation, determines the difficulty of the problem.

Quantum computing has an algorithm called Shor's algorithm that enables period finding. Finding factors of an integer can be encoded into a period finding problem. Any asymmetric algorithm encryption algorithm could be vulnerable.

SUMMARY

A computer-implemented method, according to one aspect of the invention, includes generating two tensile circles based on a common circle created by overlapping two tensile spheres. An angle is determined using a modulo function and a predefined value. The angle is applied to both tensile circles. Next, multiplicands are determined for both tensile circles based on the angle applied to both tensile circles. Data is then encrypted and/or decrypted using a symmetric cryptography technique and the multiplicands.

The method provides a new process of symmetric cryptography using the intersection of two tensile spheres in order to protect two parties sharing information. Moreover, two parties may exchange data, information, etc. securely and encrypted at line speed. Further the features improves cryptography, especially in light of Quantum Computing, by providing more untraceable values.

In one aspect, the common circle is determined at an intersection of the two tensile spheres, where one of the tensile circles is defined by one of the tensile spheres and the other of the tensile circles is defined by the other of the tensile spheres. A technical feature and/or advantage of these particular features is that they provide unique identification of values for each tensile circle, where the tensile circle is known by its respective party only.

In one aspect, the multiplicands include a first multiplicand determined from the one of the tensile circles and a second multiplicand determined from the other of the tensile circles. One technical feature and/or advantage of this feature is that it provides anonymity between the parties of the value determined for encryption and/or decryption.

In some aspects, a first of the tensile spheres is a map of a predefined first scalar entropy value function selected by a first of the parties and a second of the tensile spheres is a map of a predefined second scalar entropy value function selected by a second of the parties. The predefined first and/or second scalar entropy value function is not shared between the parties. This feature improves the complexity of the symmetric cryptography for sharing data.

In some aspects, an extent of overlap between the tensile spheres is determined by a predefined overlap factor. One technical effect and/or advantage of the predefined overlap factor is that it allows each party to determine a corresponding tensile circle relative to the intersection of the two tensile spheres.

In one aspect, the predefined overlap factor is defined by an agreement between the two parties sharing the data. One technical effect and/or advantage of this feature is that it provides an anonymity between the two parties and the respective selected tensile sphere.

In one aspect, the predefined value is defined by an agreement between the two parties sharing the data. One technical effect and/or advantage of this feature is that it provides an improved process of computing a missing multiplicand from a source unique to each party and unknown to each other.

A computer program product, according to another aspect, includes a computer readable storage medium having program instructions embodied therewith. The program instructions are readable and/or executable by a computer to cause the computer to perform the foregoing method.

A system, according to another aspect, includes a processor, and logic integrated with the processor, executable by the processor, or integrated with and executable by the processor. The logic is configured to perform the foregoing methodology.

Other aspects and aspects of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one aspect of the present invention.

DETAILED DESCRIPTION

Figure 2:
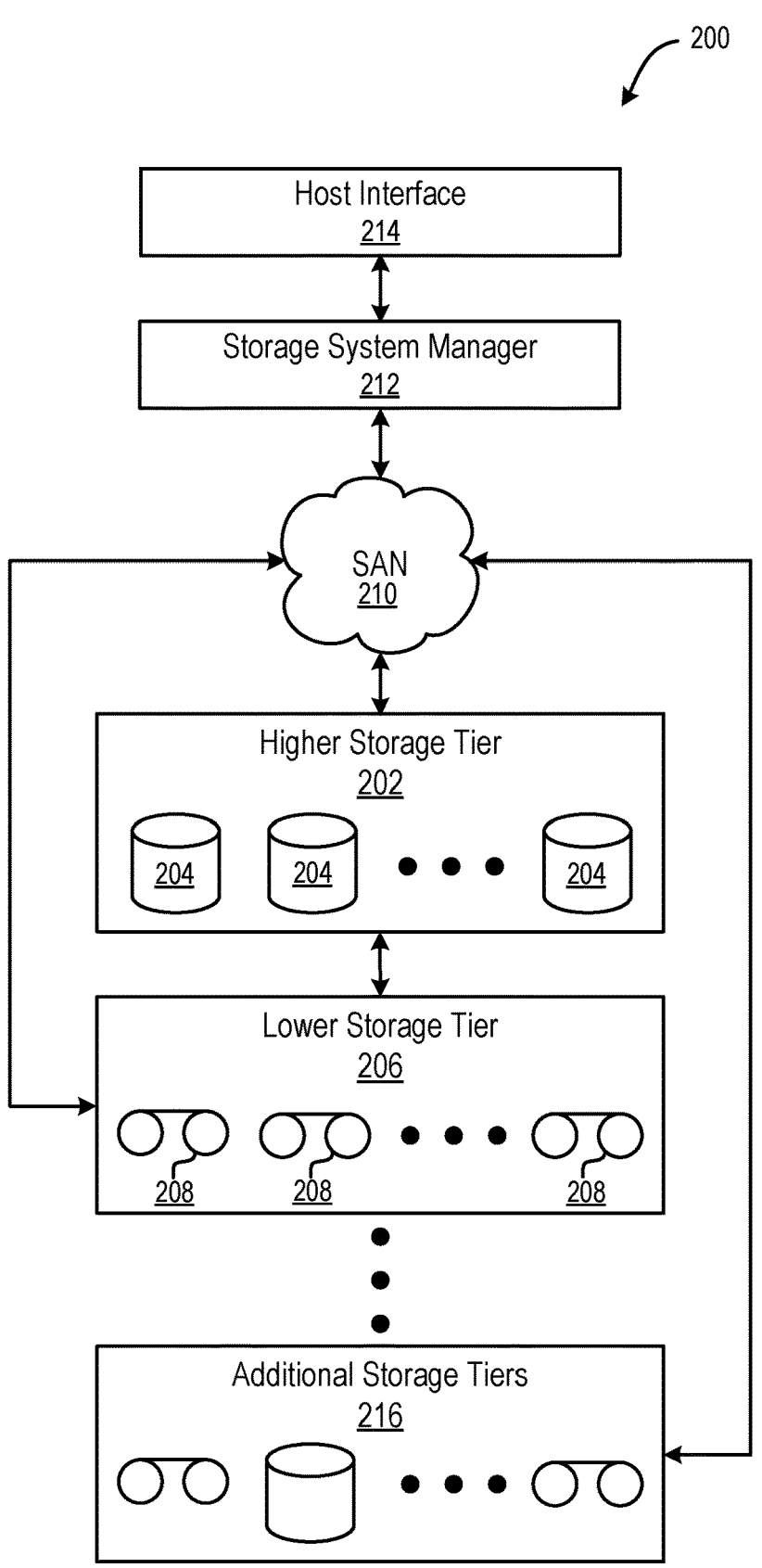
FIG. 2 is a diagram of a tiered data storage system, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for using tensile spheres in symmetric cryptography.

In one general aspect, a computer-implemented method includes generating two tensile circles based on a common circle created by overlapping two tensile spheres. An angle is determined using a modulo function and a predefined value. The angle is applied to both tensile circles. Next, multiplicands are determined for both tensile circles based on the angle applied to both tensile circles. The method then encrypts and/or decrypts data using a symmetric cryptography technique and the multiplicands.

The method provides a new process of symmetric cryptography using the intersection of two tensile spheres in order to protect two parties sharing information. Moreover, two parties may exchange data, information, etc. securely and encrypted at line speed. Further the features improves cryptography, especially in light of Quantum Computing, by providing more untraceable values.

In one aspect, the common circle is determined at an intersection of the two tensile spheres, where one of the tensile circles is defined by one of the tensile spheres and the other of the tensile circles is defined by the other of the tensile spheres. A technical feature and/or advantage of these particular features is that they provide unique identification of values for each tensile circle, where the tensile circle is known by its respective party only.

In one aspect, the multiplicands include a first multiplicand determined from the one of the tensile circles and a second multiplicand determined from the other of the tensile circles. One technical feature and/or advantage of this feature is that it provides anonymity between the parties of the value determined for encryption and/or decryption.

In some aspects, a first of the tensile spheres is a map of a predefined first scalar entropy value function selected by a first of the parties and a second of the tensile spheres is a map of a predefined second scalar entropy value function selected by a second of the parties. The predefined first and/or second scalar entropy value function is not shared between the parties. This feature improves the complexity of the symmetric cryptography for sharing data. Moreover, this feature improves the technical effect of anonymity between the parties of the source of the respective value that is used for the symmetric cryptography.

In some aspects, an extent of overlap between the tensile spheres is determined by a predefined overlap factor. One technical effect and/or advantage of the predefined overlap factor is that it allows each party to determine a corresponding tensile circle relative to the intersection of the two tensile spheres.

In one aspect, the predefined overlap factor is defined by an agreement between the two parties sharing the data. One technical effect and/or advantage of this feature is that it provides an anonymity between the two parties and the respective selected tensile sphere.

In one aspect, the predefined value is defined by an agreement between the two parties sharing the data. One technical effect and/or advantage of this feature is that it provides an improved process of computing a missing multiplicand from a source unique to each party and unknown to each other.

In another general aspect, a computer program product includes a computer readable storage medium having program instructions embodied therewith. The program instructions are readable and/or executable by a computer to cause the computer to perform any aspects of the foregoing methodology.

In another general aspect, a system includes a processor, and logic integrated with the processor, executable by the processor, or integrated with and executable by the processor. The logic is configured to perform any aspects of the foregoing methodology.

In one approach, an application of the method described herein is directed to a new type of symmetric cryptography protocol or process. A symmetric cryptography application may be described in an exemplary scenario where the process of using the intersection of two tensile spheres may protect two parties sharing information. In one approach, an example scenario includes an aspect where two parties exchange data, information, etc. securely and encrypted at line speed. Such technical use cases are typically described in the invention disclosure.

Various aspects of the present disclosure are described by narrative text, flowcharts, block diagrams of computer systems and/or block diagrams of the machine logic included in computer program product (CPP) aspects. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product aspect ("CPP aspect" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as migration plan generation module of block 150 for migrating write data between caches of different storage systems according to a data migration plan in order to prevent cache overdrive. In addition to block 150, computing environment 100 includes, for example, computer 101, wide area network (WAN) 102, end user device (EUD) 103, remote server 104, public cloud 105, and private cloud 106. In this aspect, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various aspects, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some aspects, storage 124 may take the form of a quantum computing storage device for storing data in the form of qubits. In aspects where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some aspects, network control functions and network forwarding functions of network module 115 are performed on the same physical hardware device. In other aspects (for example, aspects that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some aspects, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some aspects, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other aspects a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 105 and private cloud 106 are both part of a larger hybrid cloud.

In some aspects, a system, according to various aspects, may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Now referring to FIG. 2, a storage system 200 is shown, according to one aspect. Note that some of the elements shown in FIG. 2 may be implemented as hardware and/or software, according to various aspects. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the aspects presented herein.

According to some aspects, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Of course, this logic may be implemented as a method on any device and/or system or as a computer program product, according to various aspects.

While shifting the complexity of the mathematical problem from Galois-field (e.g., non-EC) cryptography as a hedge against the increase in traditional computing power by using Elliptic-Curve (EC) cryptography has been successful, recent advances in Quantum Computing indicate that EC will soon fail to maintain supremacy.

For example, asymmetric cryptography is based on the idea that between two parties A and B, a PKI cryptography is established. A uses a private key to encrypt data and the corresponding public key is mathematically linked to the encrypted data so that B can decrypt the data with the public key. Likewise, B may encrypt data to send back to A using a private key that is different from A's private key. A uses the public key provided by B to decrypt the encrypted data received from A. The system is asymmetric because the mathematical function associated with A's private key is different than the mathematical function associated with B's private key.

Given that the basis of PKI cryptography hinges on the inability to compute the missing multiplicand from the original and product points to stay ahead of QC the choice of multiplicands needs to be non-deterministic and large. As such, the methods described herein pivot toward symmetric encryption.

Within quantum computing, Shor's algorithm can be used to factor numbers in a large Hilbert space represented by qubit tensor products. The representation of a large space by quantum computing encoding makes asymmetric encryption vulnerable. However, symmetric encryption are quantum-safe with large numbers of bits. As such, a mechanism is required to extend the state of the art for symmetric encryption.

PKI cryptography is used to set up a trusted communication channel over which the shared value for the symmetric cryptography is transmitted. For example, A and B agree to talk with each other, A and B confirm that they can securely exchange information, then A and B agree on a single mathematical function performed by each A and B to transmit the information over the secure channel. As described herein, tensile spheres are used for the symmetric cryptography part that comes after the PKI cryptography of setting up the connection between the two parties, correspondents, sender/receiver, etc. After the secure channel is established by asymmetric cryptography, and the symmetric key is shared between the parties, then the parties use symmetric cryptography to share information. Symmetric cryptography is faster than asymmetric cryptography such that symmetric cryptography may allow exchange of information, data, etc. at line speed.

Figure 3:
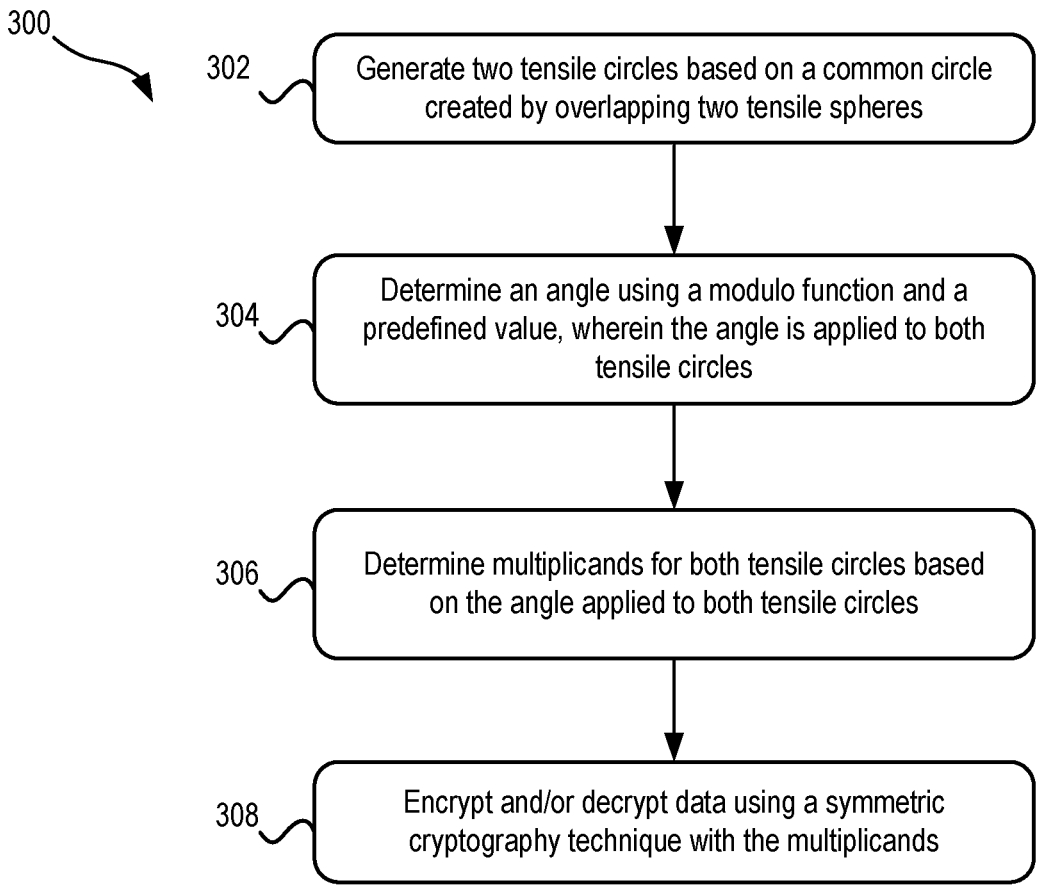
FIG. 3 is a flowchart of a method, in accordance with one aspect of the present invention.

Now referring to FIG. 3, a flowchart of a method 300 is shown, according to one aspect. Method 300 may be performed in accordance with the present invention in any of the environments depicted in FIGS. 1-2, among others, in various aspects. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various aspects, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

According to an aspect of the invention, there is provided a method 300 that enables symmetric cryptography between two parties to allow exchange of information at line speed. Method 300 begins with operation 302 of generating two tensile circles based on a common circle created by overlapping two tensile spheres. As described herein, according to one aspect, a well-known mathematical function "Modulo" is used as a one-way gate between the crypto and cracking problem domains from the circular intersection created by two tensile spheres.

Figure 4:
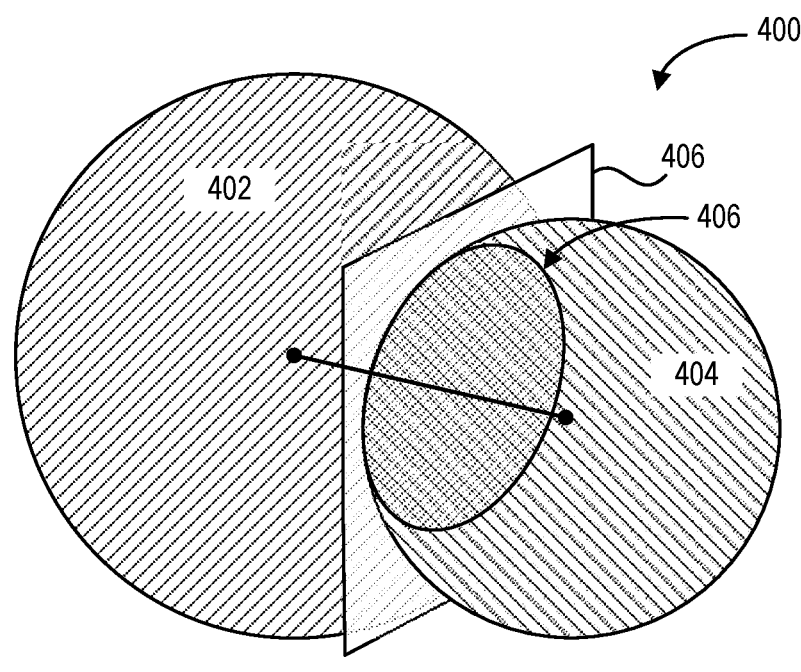
FIG. 4 is a schematic diagram of two intersecting spheres.

FIG. 4 illustrates a schematic drawing of an intersection 400 of two spheres 402, 404, respectively. The plane at the point of intersection of the two spheres 402, 404 creates a common circle 406 shared between the two spheres 402, 404, where the common circle is shared by both spheres 402, 404. Additionally, or alternatively, in one aspect, the common circle is determined at an intersection of the two tensile spheres. The circular intersection of two tensile spheres creates a common circle between the two tensile spheres. The common circle generates tensile circles on both tensile spheres where one of the tensile circles is defined by one of the tensile spheres and the other of the tensile circles is defined by the other of the tensile spheres.

A modulo operation returns the remainder of a division operation, after one number is divided by another. A remainder, as calculated by the modulo, stripped from its corresponding quotient, cannot be tied back to the original value. For instance, if a real number (R) can be described as a fraction (a/b) of two arbitrary integers (a and b), and uniquely described as the one where the numerator (a) is the least absolute value, so it can be described in terms of quotient and remainder (q and r, respectively) through the relationship $$(b * q) + r = a \qquad \text{Equation 1}$$

In one example, the time of day is usually expressed as a tuple (or triple) of hours and minutes (and optionally seconds) which is in essence the number of turns of the hour hand plus the remainder minutes. Keen observation shows that telling time in this way is related to Equation 1 where a is the number of elapsed minutes in a day and b=60.

Without knowing b, q cannot be determined from a and r. Or put another way, one cannot know the accurate position of the hours hand (e.g., q) on a clock face by knowing the time of day (e.g., a), and the current position of minutes hand (e.g., r) if how many minutes in an hour (e.g., b) is not known. It is this uncertainty which is leveraged as a modular exponentiation by implementations of PKI cryptosystems, such as Rivest-Shamir-Adleman (RSA) and Diffie-Hellman key exchange (DH), and guarantees the intractability of the mathematical problem posed by the method described herein.

For current cryptographic purposes, an elliptic curve is a plane curve over a finite field (rather than real numbers) which includes points satisfying Equation 2.

$$y^2 = x^3 + ax + b \qquad \text{Equation 2}$$

Along with a distinguished point at infinity, denoted ∞. The basic concept of elliptical cryptography is that given the x-value, the y-intercept is solved; however, given the y-value, the corresponding x-value is not easily solved. For example, a secure system may be set up based on each party defining an exponent, and a unique number is found, but the function is a "one-way" function.

As illustrated in one example in FIG. 4, according to the approach described herein, any two spheres that intersection have a circle in common at the points of intersection of the two spheres. A tensile sphere is a sphere whose surface is a known, predefined map of (x, y, z) of a function, such that at each point of the sphere, the coordinates (x, y, z) are known on the surface of the sphere.

Figure 5:
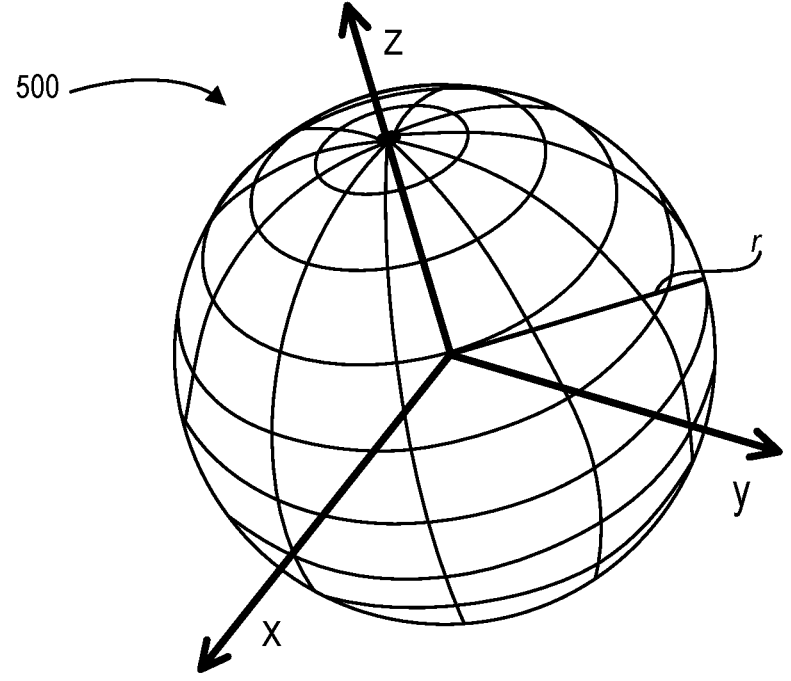
FIG. 5 is a schematic diagram of a sphere in Euclidean space.

In one approach, a sphere 500 as illustrated in FIG. 5, has a radius r in Euclidean space. A sphere is merely a collection of points equidistant by a distance r from a reference point. A tensile sphere has a function that is mapped across the surface of the sphere; specifically, for each point in the collection, a scalar value is present and/or defined. For example, a regulation basketball represented as a tensile sphere would have for each point on the surface a scalar value being the color orange or black, a soccer ball represented as a tensile sphere would have for each point on the surface a scalar value being black or white. The difference between a sphere and a tensile sphere is that a tensile sphere implements a tensor field, whereas a sphere is simply a collection of points. For the purposes of the method described herein, a tensile sphere is a curve over a finite space which includes the points satisfying Equation 3.

$$(x - a)^2 + (y - b)^2 + (z - c)^2 = r^2 \qquad \text{Equation 3}$$

Where r=1 over which an arbitrary scalar entropy value function. Additionally, or alternatively, each of the two intersecting tensile spheres may be a map of a scalar entropy value function which has the technical effect of and/or may be useful for overcoming the recent advances in Quantum Computing that will overcome EC cryptography by providing more untraceable values.

Figure 6:
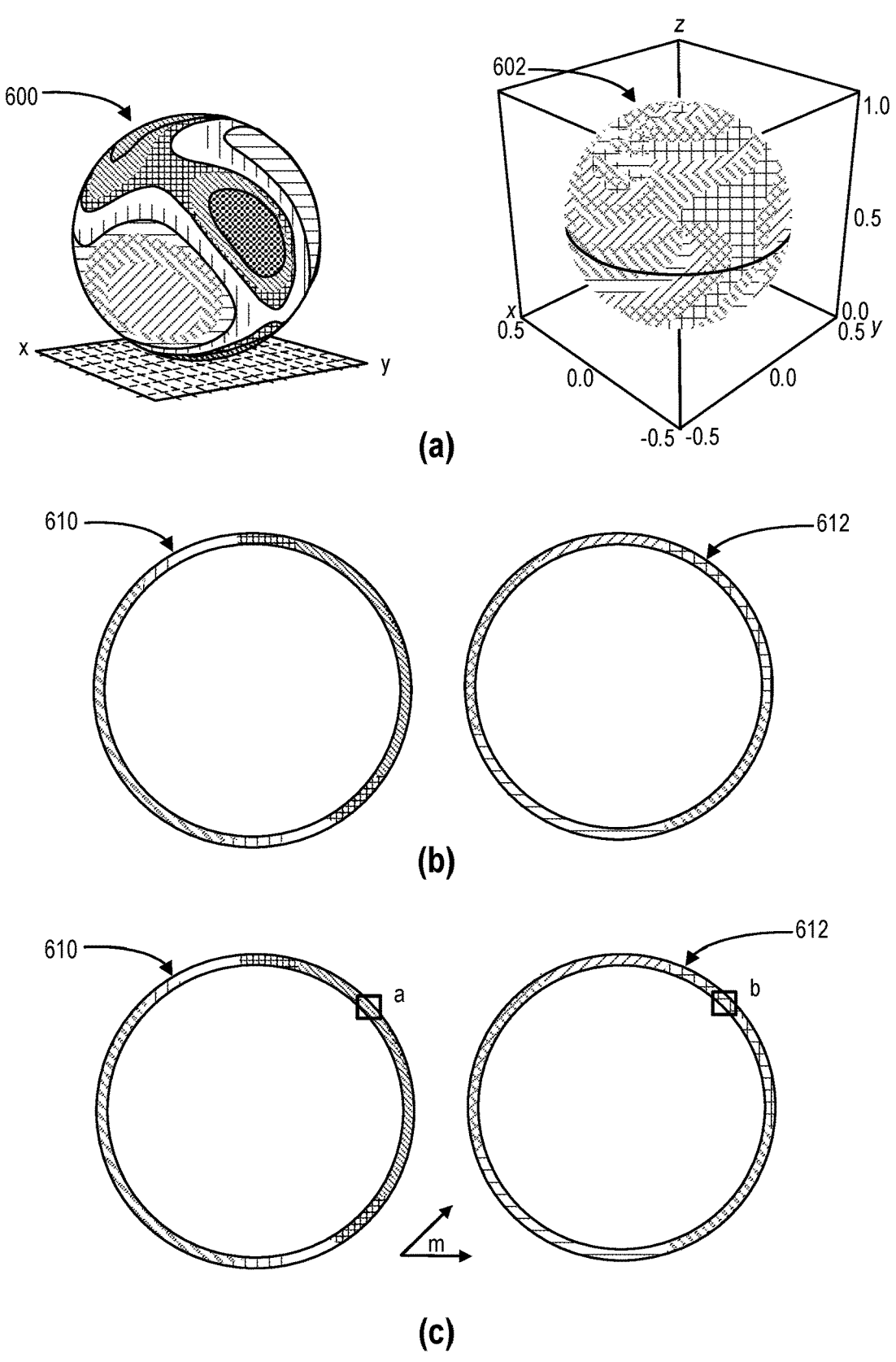
FIG. 6 is a schematic diagram of determining at least one multiplicand from two tensile spheres, according to one aspect of the invention. Part (a) illustrates two tensile spheres, each having a map of a scalar entropy value function, part (b) illustrates a tensile circle created from the intersection of the tensile spheres of part (a), part (c) illustrates the determination of at least one multiplicand for each tensile circle.

An example of a predefined scalar entropy value function may be mapped as shown in FIG. 6. A tensile sphere illustrates a visualization of a predefined scalar entropy value function mapped over a spherical Euclidean space. In one example, in part (a) of FIG. 6, the tensile sphere 600 may represent the barometric pressure at sea level on planet Earth on Jun. 15, 2022, and the tensile sphere 602 may represent the wind speed on planet Earth on Jul. 30, 1996. Each tensile sphere represents a predefined scalar entropy value function, e.g., a set of numbers, mapped on the surface of a sphere. The values of a predefined scalar entropy value function are known at any point on the surface of the sphere. The scalar entropy value function is any predefined function that may be mapped according to Equation 3, e.g., a physical characteristic of a planet at any point in time, the incidence of global COVID-19 infections at a specific point in time during the pandemic, etc.

In one approach, a predefined first scalar entropy value function is selected by a first party and the predefined second scalar entropy value function is selected by a second party. The first and second parties agree to send encrypted information to each other.

Additionally, or alternatively, an aspect of the invention where the identity of the selected predefined scalar entropy value function of each party is not shared between the parties may have the technical effect of anonymity between the parties of the source of each respective value that is used for the symmetric cryptography. In one approach, the predefined first scalar entropy value function selected by one party (as mapped on a first tensile sphere) may be different than a predefined second scalar entropy value function selected by the other party (as mapped on a second tensile sphere). In another aspect, the predefined first scalar entropy value function selected by one party may be the same as the predefined second scalar entropy value function.

An intersection of two spheres creates a circle, which for the purposes described herein creates a finite field of values where the scalars from each mapped tensile sphere may be used as the a and b multiplicand factors used in traditional PKI cryptographic functions. The circle of the intersection point is created at an overlap factor t, where a tensile sphere overlaps another sphere at predefined overlap factor, t. The two intersecting tensile spheres overlap by a predefined overlap factor. The overlap factor is a fraction that represents a scalar percentage of overlap for each sphere. The value of the overlap factor t is a number greater than zero and less than 1, 0<t<1. If t=0, the tensile spheres are tangents of each other, and if t=1, the two tensile spheres completely overlap each other. The size of each tensile sphere may be different, the overlap factor t is a percentage of overlap of each sphere, respectively. For example, for a t=¼, or 0.25, each tensile sphere overlaps the adjacent sphere by 25% of each sphere.

Figure 7:
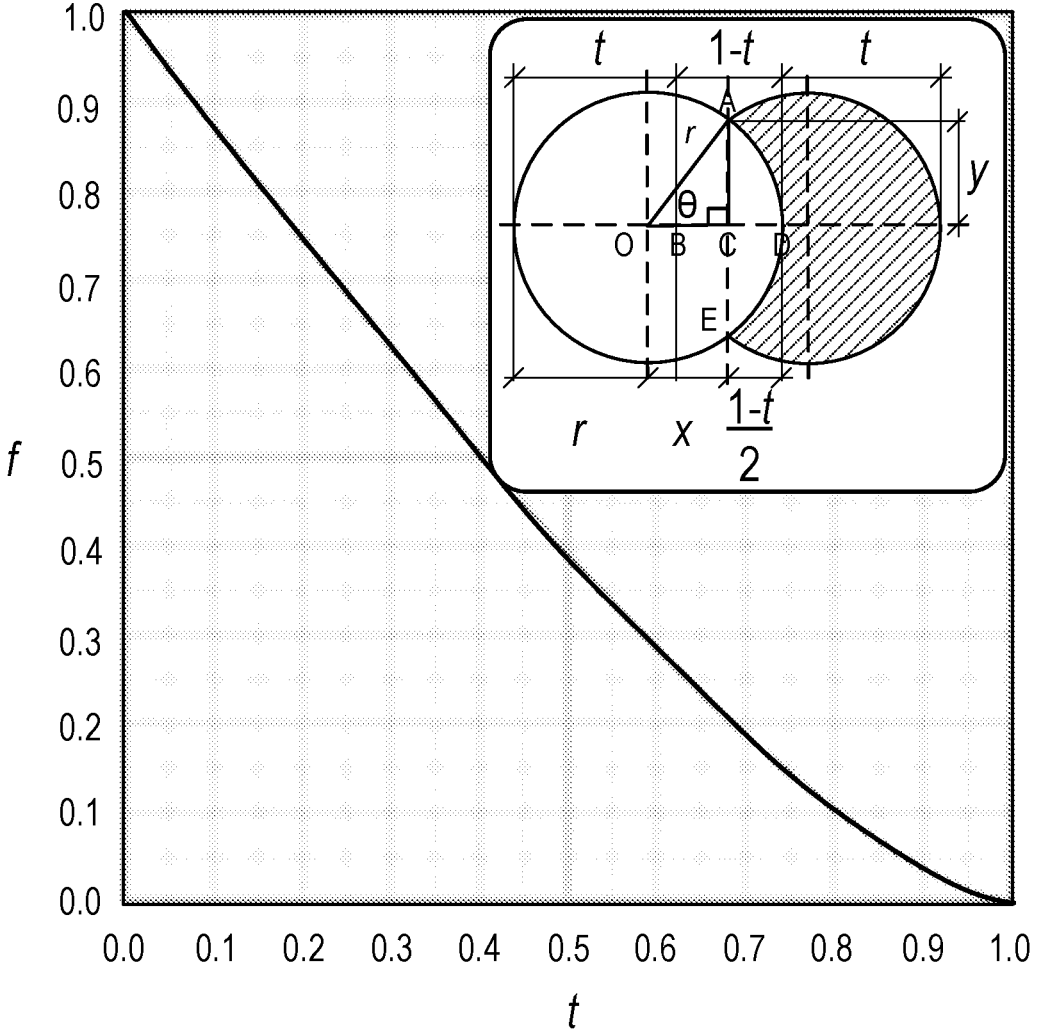
FIG. 7 is a plot representing an example of an extent of overlap for two spheres corresponding to an overlap factor.

In one example, an overlap fraction t of the sun and the moon is illustrated in FIG. 7. The curve of FIG. 7 illustrates a fraction f of the sun's disc covered when the same-sized discs are offset a fraction t of their diameter. For example, if t=0.50, the circle for each tensile sphere representing planet Earth (at different times with different conditions) would be at the equator, prime meridian, etc. of planet Earth. Each respective tensile circle represents a series of numbers that are random, but are identified as the values of the function at the point of intersection with the other intersecting tensile sphere. For each tensile circle, the series of numbers at intersection is known only to the respective party.

Additionally, or alternatively, the extent of overlap between the two tensile spheres is determined by a predefined overlap factor t that may be determined by an agreement between the two parties. The overlap factor t is a predefined value known by each of the parties, sender/receiver, etc. The technical effect and/or advantage of the predefined overlap factor allows each party to determine a corresponding tensile circle relative to the intersection of the two tensile spheres.

Given two well-known tensile spheres mapping known entropy scalar value, such as exemplified in FIG. 6, and an overlap fraction factor t, a circle of commonality between the two spheres may be produced which creates two distinct tensile spheres with mapped scalars. Part (b) of FIG. 6 illustrates two tensile circles 610, 612 created at the intersection of the two tensile spheres 600, 602, respectively, for a predefined overlap fraction t.

In one example, referring to FIG. 6, A chooses the tensile sphere 600 of part (a) that generates the tensile circle 610 of part (b) at the intersection with tensile sphere 602. Tensile circle 610 includes a series of values known only to A. Similarly, B chooses the tensile sphere 602 of part (a) that generates the tensile circle 612 of part (b) at the intersection with tensile sphere 600. Tensile circle 612 includes a series of values known only to B. A and B do not reveal their respective tensile circles to each other, the shared predefined component between A and B is the predefined overlap fraction t that determines the location of the tensile circle on the respective tensile sphere.

Referring back to method 300 of FIG. 3, operation 304 includes determining an angle using a modulo function and a predefined value, wherein the angle is applied to both tensile circles. Additionally, or alternatively, the predefined value is determined by an agreement between the two parties providing an advantage of both parties utilizing the modulo function to determine the same angle m. For example, the predefined value q known between the two parties is agreed upon, from which a modulo function is applied to result in a remainder value (referring back to Equation 1). In an exemplary approach, the remainder value determined from a known value q is an angle m.

Operation 306 includes determining multiplicands for both tensile circles based on the angle applied to both tensile circles. The multiplicands include a first multiplicand determined from the one of the tensile circles (defined by the one of the tensile spheres) and a second multiplicand determined from the other of the tensile circles (defined by the other of the tensile spheres). The multiplicands a and b are the values of the corresponding tensile circles at angle m multiplied by q, e.g., $f_a(m)*q$, and $f_b(m)*q$.

As shown in the example in FIG. 6, part (c) identifies the multiplicand values a and b, of both tensile circles, respectively, according to an angle m. Each party selects a value of the multiplicand, according to angle m, from the respective tensile circle, where the selected value is known only to the respective party selecting the value. For example, A selects a from tensile circle 610, and a is unknown to B; and, similarly, B selects b from tensile circle 612, and b is unknown to A. In various approaches, any symmetric cryptography schemes may be applied.

Operation 308 includes encrypting and/or decrypting data using a symmetric cryptography technique and the multiplicands. An infinite number of entropy scalar value functions may be mapped onto a Euclidean sphere to form a tensile sphere; therefore, the scheme is infinitely extensible. Well-known tensile spheres may be named that public agreement of usage may develop, even by named-pairs.

In one approach, drop-in replacement into existing cryptographic schemes where ECC, RSA PKI, and symmetric encryption is used is possible.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method for encrypting and/or decrypting data using a symmetric cryptography technique between two parties sharing the data, the computer-implemented method comprising:
  obtaining a connection between the two parties for sharing the data;
  receiving a first tensile sphere chosen by a first of the two parties;
  receiving a second tensile sphere chosen by a second of the two parties;
  generating two tensile circles based on a common circle created by overlapping the two tensile spheres;
  determining an angle using a modulo function and a predefined value, wherein the angle is applied to both tensile circles;
  determining multiplicands for both tensile circles based on the angle applied to both tensile circles; and
  encrypting and/or decrypting the data using the symmetric cryptography technique and multiplicands.

2. The computer-implemented method of claim 1, wherein the common circle is determined at an intersection of the two tensile spheres, wherein one of the tensile circles is defined by one of the tensile spheres and the other of the tensile circles is defined by the other of the tensile spheres.

3. The computer-implemented method of claim 2, wherein the multiplicands include a first multiplicand determined from the one of the tensile circles and a second multiplicand determined from the other of the tensile circles.

4. The computer-implemented method of claim 1, wherein a first of the tensile spheres is a map of a predefined first scalar entropy value function and a second of the tensile spheres is a map of a predefined second scalar entropy value function.

5. The computer-implemented method of claim 4, wherein the predefined first scalar entropy value function is different than the predefined second scalar entropy value function.

6. The computer-implemented method of claim 4, wherein the predefined first scalar entropy value function is selected by a first of the parties and the predefined second scalar entropy value function is selected by a second of the parties, wherein the predefined first and/or second scalar entropy value function is not shared between the parties.

7. The computer-implemented method of claim 1, wherein an extent of overlap between the tensile spheres is determined by a predefined overlap factor.

8. The computer-implemented method of claim 7, wherein the predefined overlap factor is defined by an agreement between the two parties sharing the data.

9. The computer-implemented method of claim 1, wherein the predefined value is defined by an agreement between the two parties sharing the data.

10. A computer program product for encrypting and/or decrypting data using a symmetric cryptography technique between two parties sharing the data, the computer program product comprising a computer readable storage medium having program instructions embodied therewith, the program instructions readable and/or executable by a hardware component to cause the computer to:
  obtain, by the hardware component, a connection between the two parties for sharing the data;
  receive, by the hardware component, a first tensile sphere chosen by a first of the two parties;
  receive, by the hardware component, a second tensile sphere by a second of the two parties;
  generate, by the hardware component, two tensile circles based on a common circle created by overlapping the two tensile spheres;
  determine, by the hardware component, an angle using a modulo function and a predefined value, wherein the angle is applied to both tensile circles;
  determine, by the hardware component, multiplicands for both tensile circles based on the angle applied to both tensile circles; and
  encrypt and/or decrypt data, by the hardware component, using the symmetric cryptography technique and the multiplicands.

11. The computer program product of claim 10, wherein the common circle is determined at an intersection of the two tensile spheres, wherein one of the tensile circles is defined by one of the tensile spheres and the other of the tensile circles is defined by the other of the tensile spheres.

12. The computer program product of claim 11, wherein the multiplicands include a first multiplicand determined from the one of the tensile circles and a second multiplicand determined from the other of the tensile circles.

13. The computer program product of claim 10, wherein a first of the tensile spheres is a map of a predefined first scalar entropy value function and a second of the tensile spheres is a map of a predefined second scalar entropy value function.

14. The computer program product of claim 13, wherein the predefined first scalar entropy value function is selected by a first of two parties sharing data and the predefined second scalar entropy value function is selected by a second of two parties sharing the data.

15. The computer program product of claim 10, wherein an extent of overlap between the tensile spheres is determined by a predefined overlap factor.

16. The computer program product of claim 15, wherein the predefined overlap factor is defined by an agreement between two parties sharing data.

17. The computer program product of claim 10, wherein the predefined value is defined by an agreement between two parties sharing data.

18. A system for encrypting and/or decrypting data using a symmetric cryptography technique between two parties sharing the data, the system comprising:

a processor; and logic integrated with the processor, executable by the processor, or integrated with and executable by the processor, the logic being configured to:

obtain a connection between the two parties for sharing the data;

receive a first tensile sphere chosen by a first of the two parties;

receive a second tensile sphere chosen by a second of the two parties;

generate two tensile circles based on a common circle created by overlapping the two tensile spheres;

determine an angle using a modulo function and a predefined value, wherein the angle is applied to both tensile circles;

determine multiplicands for both tensile circles based on the angle applied to both tensile circles; and encrypt and/or decrypt data using the symmetric cryptography technique and the multiplicands.

19. The system of claim 18, wherein the common circle is determined at an intersection of the two tensile spheres, wherein one of the tensile circles is defined by one of the tensile spheres and the other of the tensile circles is defined by the other of the tensile spheres.

20. The system of claim 18, wherein the multiplicands include a first multiplicand determined from the one of the tensile circles and a second multiplicand determined from the other of the tensile circles.

* * * * *